(12) United States Patent
Carney et al.

(10) Patent No.: US 9,379,935 B2
(45) Date of Patent: Jun. 28, 2016

(54) CACHED ROUTING SERVICE

(75) Inventors: Mark Douglas Carney, Sterling, VA (US); Harold Jason Schiller, Silver Spring, MD (US); Dante John Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 307 days.

(21) Appl. No.: 13/193,816

(22) Filed: Jul. 29, 2011

(65) Prior Publication Data
US 2013/0028258 A1  Jan. 31, 2013

(51) Int. Cl.
| | |
|---|---|
| H04L 12/741 | (2013.01) |
| H04L 12/54 | (2013.01) |
| H04L 12/58 | (2006.01) |
| H04L 29/08 | (2006.01) |
| H04L 29/06 | (2006.01) |
| H04L 12/747 | (2013.01) |
| H04L 12/723 | (2013.01) |
| H04L 25/05 | (2006.01) |

(52) U.S. Cl.
CPC ........ *H04L 29/0872* (2013.01); *H04L 29/0653* (2013.01); *H04L 45/742* (2013.01); *H04L 25/05* (2013.01); *H04L 29/08549* (2013.01); *H04L 45/50* (2013.01); *H04L 2212/00* (2013.01)

(58) Field of Classification Search
CPC ... H04L 1/1809; H04L 12/5693; H04L 12/56; H04L 45/742; G06F 12/0888; G06F 12/121
USPC ........ 370/396, 229, 235, 351, 395, 392, 352, 370/331, 412, 369, 395.71, 428; 709/227, 709/238, 213, 214; 703/2; 455/412.1
See application file for complete search history.

(56) References Cited

U.S. PATENT DOCUMENTS

| | | | |
|---|---|---|---|
| 6,275,493 B1 * | 8/2001 | Morris et al. | 370/395.4 |
| 6,611,522 B1 * | 8/2003 | Zheng et al. | 370/395.21 |
| 6,826,599 B1 * | 11/2004 | Shaffer | G06F 12/0888 709/213 |
| 7,149,664 B1 * | 12/2006 | Firoiu | H04L 12/5693 370/230 |
| 8,144,714 B1 * | 3/2012 | Buchko et al. | 370/396 |
| 2006/0165070 A1 * | 7/2006 | Hall et al. | 370/369 |
| 2007/0201438 A1 * | 8/2007 | Yoon et al. | 370/352 |
| 2010/0034170 A1 * | 2/2010 | Hirano et al. | 370/331 |
| 2011/0228794 A1 * | 9/2011 | Yong et al. | 370/412 |
| 2011/0317703 A1 * | 12/2011 | Dunbar et al. | 370/392 |
| 2012/0030360 A1 * | 2/2012 | Sanders | 709/227 |
| 2012/0102136 A1 * | 4/2012 | Srebrny et al. | 709/213 |

\* cited by examiner

*Primary Examiner* — Alpus H Hsu
*Assistant Examiner* — Camquyen Thai

(57) ABSTRACT

A device may receive a packet, determine whether the received packet is encapsulated with a first header associated with a cached routing service, and determine whether the received packet is to be provided with the cached routing service when the received packet is not encapsulated with the first header associated with the cached routing service. In response to determining that the received packet is to be provided with the cached routing service, the device may encapsulate the received packet with a second header associated with the cached routing service, send the encapsulated packet toward a destination of the packet, and store the encapsulated packet in a buffer in a memory.

20 Claims, 11 Drawing Sheets

CACHED ROUTING SERVICE

BACKGROUND INFORMATION

A typical router performs two functions: a routing function and forwarding function. The routing function includes exchanging routing messages (e.g., route advertisements) with other network devices to generate a forwarding information base (FIB). The forwarding function includes forwarding packets toward their destinations in accordance with forwarding entries in the FIB.

DETAILED DESCRIPTION OF PREFERRED EMBODIMENTS

The following detailed description refers to the accompanying drawings. The same reference numbers in different drawings may identify the same or similar elements.

As used herein, the term "packet" may refer to an Internet Protocol (IP) packet, datagram, cell, a fragment of an IP packet, or other types of data that may be carried at a specified communication layer. In addition, the term "packet" may refer to a copy of a packet (i.e., a duplicate other than time stamp) as well as the original packet. As used herein, the term "router" may refer to a network level 2 or level 3 (e.g., an IP level) router or switch (e.g., Multiprotocol Label Switching (MPLS) router). Depending on the context, the term "routing" may be used in lieu of the term "forwarding."

As described herein, one or more routers may provide a cached routing service. In the cached routing service, packets are guaranteed to be successfully routed to their destinations. Guaranteed routing of the packets may be valuable for many types of applications (e.g., conveying syslog messages which are typically delivered by User Datagram Protocol (UDP), transactional applications, NASDAQ or brokerage related applications, etc.).

Figure 1:
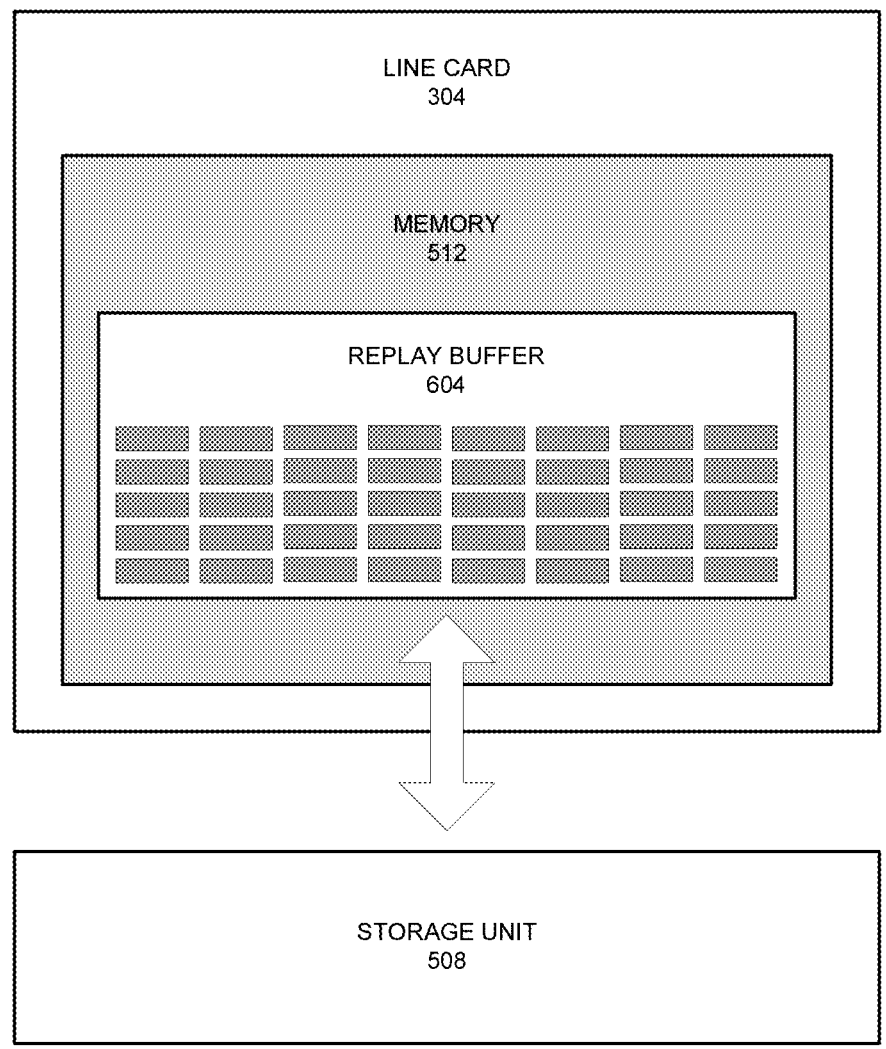
FIG. 1 illustrates concepts described herein.

FIG. 1 illustrates the concepts described herein. As shown, a router may include a line card 304 and storage unit 508. Line card 304 may send each of incoming packets to one or more egress line cards in the router. An egress line card may transmit the received packets toward their destinations in a network. As further shown in FIG. 1, line card 304 may include memory 512, which, in turn, may include a replay buffer 604 that caches packets. Line card 304 may also include connectivity to storage unit 508.

In FIG. 1, as packets arrives, line card 304 encapsulates each packet that requests the cached routing service. After line card 304 forwards each encapsulated packet to a router in a path toward its destination, line card 304 may place a copy of the encapsulated packet in replay buffer 604 or storage unit 508. When line card 304 receives an acknowledgment or a notification from a target router (one of the routers on the path toward the destination of the packet), that a particular encapsulated packet has reached the target router, line card 304 may flag/remove the copy in/from replay buffer 604 and/or storage unit 508.

In some implementations, if line card 304 does not receive such a notification within a given period of time, line card 304 may fetch the copy from replay buffer 604/storage unit 508, and forward the copy to the destination. Line card 304 may repeatedly transmit the copy until line card 304 receives a notification. Alternatively, line card 304 may stop retransmitting the copy, and the router, which includes line card 304, may send an alarm to an administrator, user, or management device. In addition, periodically, line card 304 may flush its replay buffer 604 to storage unit 508.

Storage unit 508 may receive, from line card 304, copies of the encapsulated, transmitted packets in replay buffer 604. Storage unit 508 may be centrally connected to many line cards or directly connected to a single line card and may used in lieu of replay buffer 604 or as supplementary capacity to replay buffer 604. Depending on the implementation, the router may retrieve the packets from storage unit 508 for various purposes, such as replaying transmissions of packets over a given duration, deep inspection of the transmitted packets, etc. If a packet whose notification has not yet been received is in storage unit 508, the packet may be removed from storage unit 508 when the notification is received. Alternatively, the packet may be flagged when the notification is received. line card 304 may also include connectivity to storage unit 508. Storage unit 508 may also capture statistics and activity logging in regards to cached routing service.

Figure 2:
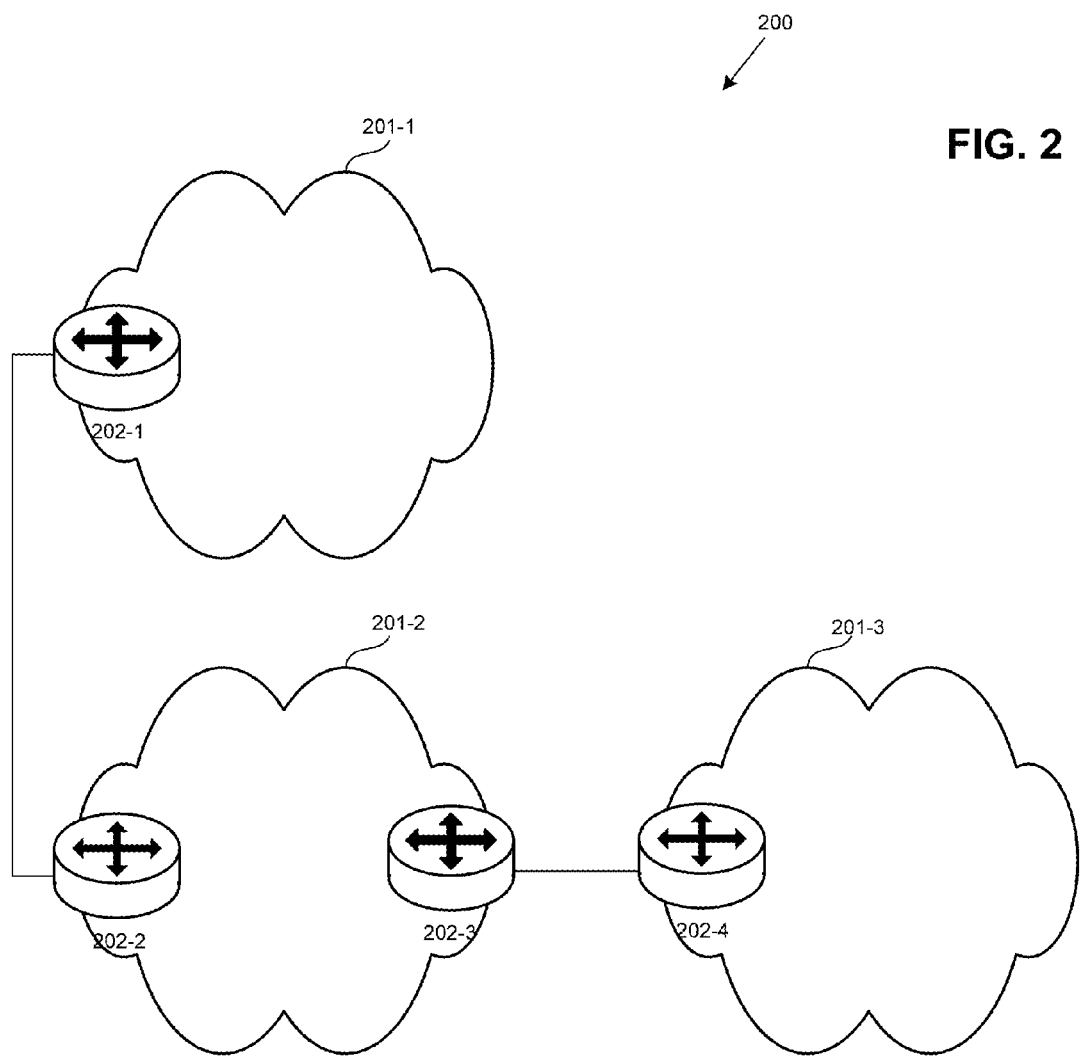
FIG. 2 show an exemplary network in which the concepts described herein may be implemented.

FIG. 2 illustrates a network 200 in which concepts described herein may be implemented. Network 200 may include the Internet, an intranet, a local area network (LAN), a wide area network (WAN), a metropolitan area network (MAN), a cellular network, a public switched telephone network (PSTN), an optical network, an ad hoc network, any other network, or a combination of one or more networks. In FIG. 2, network 200 is illustrated as having at least a customer network 201-1, a provider network 201-2, and a customer network 201-3.

As shown in FIG. 2, networks 201-1 through 201-3 may include devices 202-1 through 202-4 (collectively "devices 202" or "routers 202" and individually "device 202" or "router 202"). Device 202 may include, for example, a router, switch, gateway, server, personal computer, mobile computer (e.g., mobile router, laptop computer, tablet computer, etc.), etc. Although device 202 may be implemented as any computer-like device, in the following description, device 202 is be described in terms of a router.

Router 202 may perform routing and forwarding functions. In performing the routing function, router 202 may exchange messages with other network devices through routing protocols, to discover information about reachability of destinations, the network topology, and costs associated with routes. This information is stored in the Routing Information Base (RIB).

In performing the forwarding function, router 202 may receive packets from one or more physical communication interfaces/ports, process the packets to determine their destinations, and transmit the packets on one or more physical or logical communication interfaces/ports in accordance with the determined destinations or other properties of the packets. Depending on the implementation, router 202 may or may not provide cached routing service to the transmitted packets.

In FIG. 2, router 202-1 and router 202-4 in customer networks 201-1 and 201-3 are customer edge (CE) routers. CE routers 202-1 and 202-4 may be located in customer premises and may provide an entry into and/or an exit from customer networks 201-1 and 201-3. Routers 202-2 and 202-3 are provider edge (PE) routers and may provide an entry and/or an exit from provider network 201-2.

In some implementations, PE routers 202-2 and 202-3 may provide for cached routing service. PE router 202-2 may send a packet under cached routing service. When PE router 202-3 (e.g., an edge router closest to the destination network) receives the packet, PE router 202-3 stores/caches a copy of the packet, forwards the packet toward its destination, and sends an acknowledgment packet to PE router 202-2.

Because PE router 202-3 stores a copy of the cached routing packet from PE router 202-2, if the destination device in network 201-3 fails to receive the cached routing packet, only PE router 202-3 (not PE router 202-2) needs to resend the packet. This allows the rest of network 201-2 to save network resources (e.g., additional bandwidth). Furthermore, if there is a network failure/event, PE router 202-3 may employ bandwidth bursting (e.g., sending packets in a storage unit or a replay buffer at a high rate (in a bandwidth burst) over a brief span of time) to compensate for the lost time. Showing that the data was delivered and the lost time has been made up via bandwidth bursting may prevent costly service-level-agreement (SLA) violations.

In different implementations, CE routers 202-1 and 202-4 may provide for cached routing service. In such implementations, CE router 202-1 may send a packet under cached routing service. When CE router 202-4 receives the packet (e.g., via PE router 202-3), CE router 202-4 may forward the packet to its destination. In these implementations, CE routers 202-1 and 202-4 may be responsible for caching/storing the packets. Via caching/storing packets, during hours of peak traffic, CE routers 202-1 and 202-4 may offload some of the traffic to later times when more bandwidth is available.

In the above, cached routing services that PE routers 202-2 and 202-3 or CE routers 202-1 and 202-4 implement may be termed "edge-to-edge," as only edge routers may send packets that are to be provided with the cached routing service or send acknowledgments. In other implementations, it is possible to provide for hop-by-hop cached routing service via adjacent routers. In providing the cached routing service, router 202 may encapsulate the packet in a header that identifies the cached routing service protocol. The protocol may be a stand-alone protocol, or an extension of, for example, the MPLS domain or multiple inter Area/AS MPLS domains.

Network 200 may implement cached routing service for a number of reasons. For example, through cached routing service, network devices may prevent packet losses that stem from session-less protocols (e.g., loss of syslog messages which are typically sent via UDP). In another example, a network device implementing cached routing service may allow another device to request, from the network device, traffic snapshots of given time periods. Cached routing service may also provide ways for insuring a data delivery sequence and eliminating end-to-end retransmissions in cases of failed communications.

Figure 3:
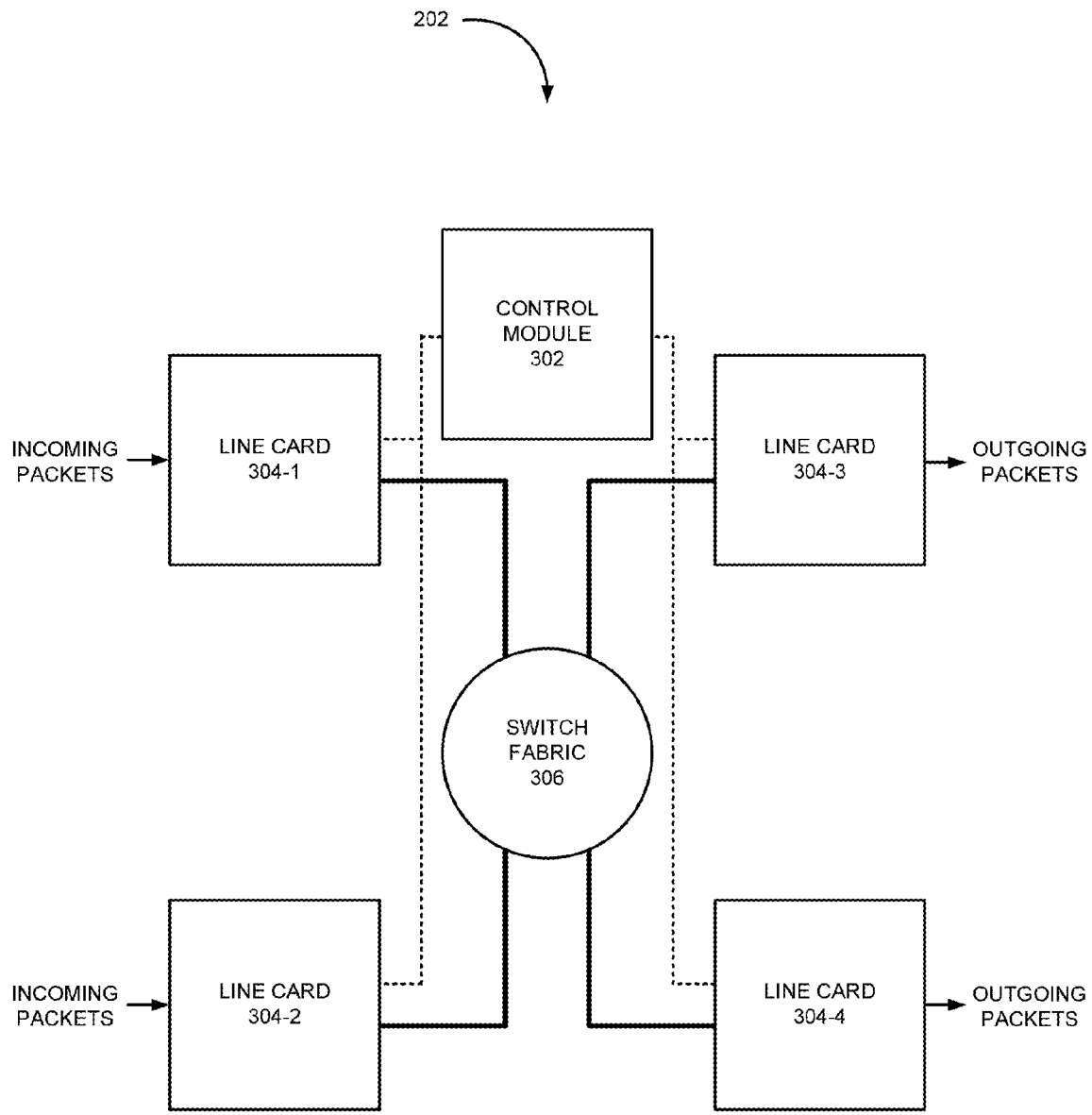
FIG. 3 shows exemplary components of an exemplary router of FIG. 2.

FIG. 3 shows exemplary components of router 202. As shown, router 202 may include a control module 302, line cards 304-1 through 304-4 (collectively "line cards 304" and individually "line card 304"), and a switch fabric 306. Control module 302 may include components for managing routes, flow statistics, and/or other types of information that may require centralized processing. For example, control module 302 may gather or disseminate routing information from/to other routers 202 in accordance with routing/signaling protocols, organize the routing information in a lookup table, etc. In another example, control module 302 may create a lookup table (e.g., a FIB) and distribute the lookup table to line cards 304.

Line card 304 may include components for receiving packets from devices or components in network 200 and for transmitting the packets to other devices in network 200. In addition, line card 304 may forward packets, classify packets, provide for the cached routing service, etc. In forwarding packets, line card 304 may act as an ingress line card and/or an egress line card. Switch fabric 306 may convey packets from line cards 304 or other modules (not shown) to other line cards 304 or other modules.

Router 202 may include fewer, additional and/or different components than those shown in FIG. 3. For example, router 202 may include additional or fewer line cards or additional control modules. In another example, router 202 may include components for performing deep packet inspection (DPI) on packets in storage unit 508 (e.g., for identifying malicious packets, etc.).

Figure 4A:
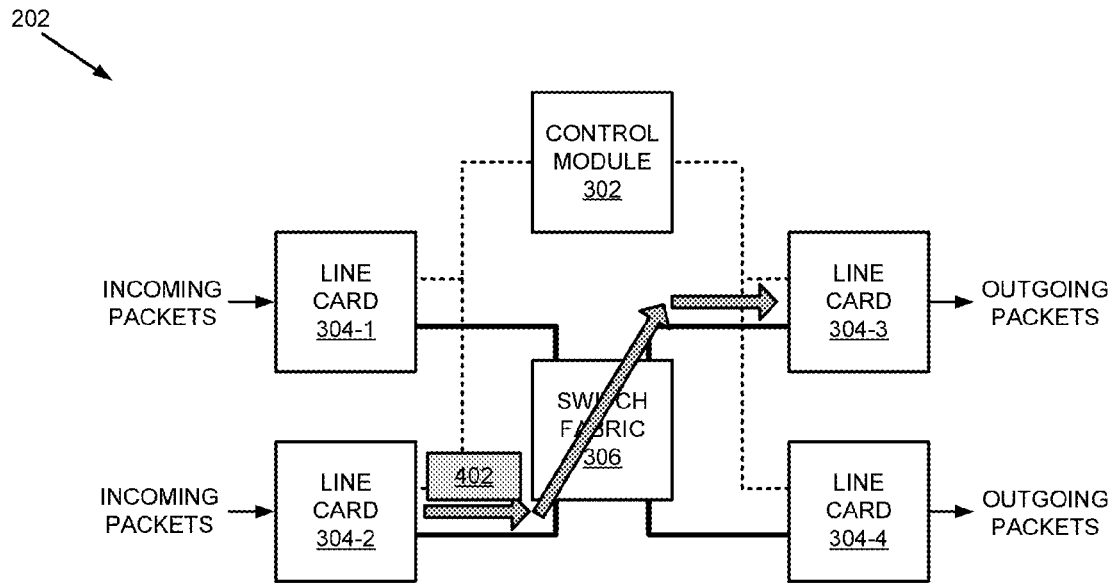
FIGS. 4A and 4B illustrate examples of a line card of FIG. 3 acting as an ingress line card or an egress line card.
Figure 4B:
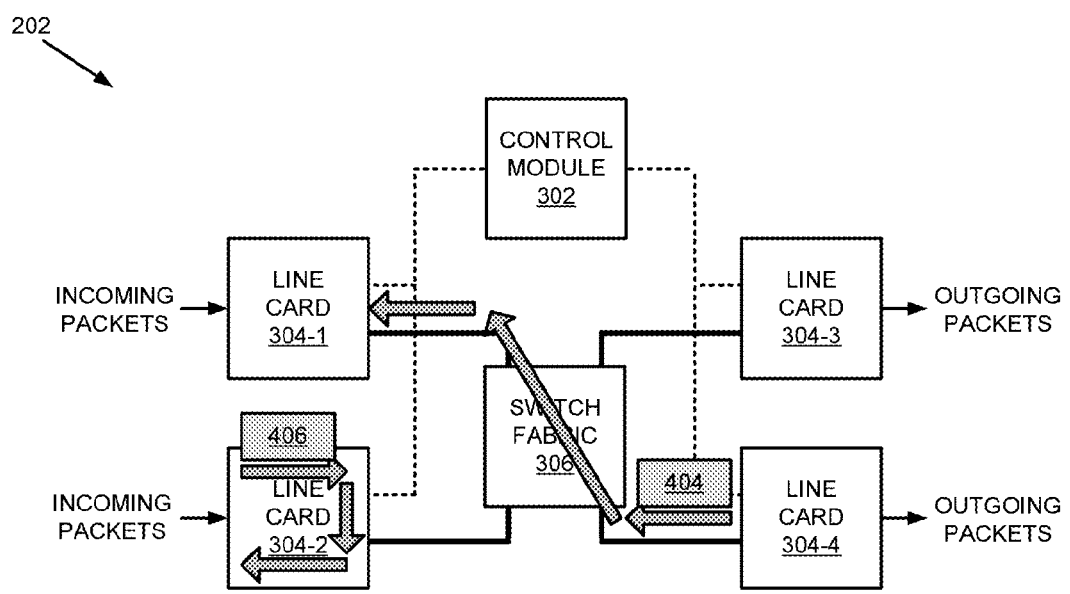

FIGS. 4A and 4B illustrate examples of line card 304 acting as an ingress or egress line card. In FIG. 4A, line card 304-2 may receive a packet 402 from network 200 via a physical or logical communication port (not shown) and send packet 402 to line card 304-3 via switch fabric 306. If delivery of packet 402 is to be guaranteed (via cached routing), line card 304-2 may encapsulate packet 402, place a copy of encapsulated packet 402 in a replay buffer (not shown) or a storage unit (not shown), and send encapsulated packet 402 to line card 304-3. When line card 304-3 receives packet 402 or encapsulated packet 402, line card 304-3 may forward the packet toward its destination in network 200 via another communication port in line card 304-3.

In FIG. 4B, line card 304-4 may receive a packet 404 from network 200 and forward packet 404 to line card 304-1. If packet 404 is to be provided with cached routing service, line card 304-4 may encapsulate packet 404, place a copy of encapsulated packet 404 in a replay buffer (not shown) or a storage unit (not shown), and forward encapsulated packet 404 to line card 304-1 via switch fabric 306. Subsequently, line card 304-1 may send the packet or the encapsulated packet toward its destination in network 200. In addition, in FIG. 4B, line card 304-2 may receive packet 406 from network 200 through a port and send packet 406 toward its destination in network 200. If packet 406 is to be provided with cached routing service, line card 304-2 may encapsulate packet 406, place packet 406 in a replay buffer (not shown) or a storage unit (not shown) of line card 304-2, and send packet 406 towards its destination in network 200 through another port. Depending on the implementation, packet 406 may or may not pass through switch fabric 306.

In FIGS. 4A and 4B, when line card 304 receives a packet and the packet is an acknowledgment (e.g., a notification from a router on the path to a destination of the corresponding packet), the line card may flag the corresponding packet in a replay buffer or a storage unit. Each of the flagged packets (copies) in the replay buffer/storage unit may no longer need to be re-forwarded to its destination.

If the received packet is not an acknowledgment but an encapsulated packet (e.g., a packet receiving cached routing service), line card 304 may de-capsulate the packet to obtain the original packet, forward the original packet toward its destination, and store, in a buffer or a storage unit, the original packet along with other information (e.g., time stamp of its transmission, ID for the original packet, etc.).

Figure 5A:
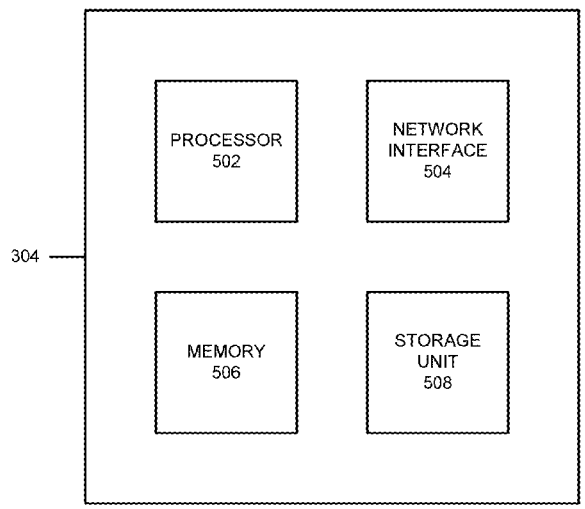
FIG. 5A is a block diagram illustrating exemplary components of an exemplary line card of FIG. 3.

FIG. 5A is a block diagram illustrating exemplary components of line card 304. As shown, line card 304 may include a processor 502, network interface 504, memory 506, and storage unit 508. Depending on the implementation, line card 304 may include additional, fewer, different, or different arrangement of components than those illustrated in FIG. 5A. For example, in a different implementation, line card 304 may not include storage unit 508. In such implementations, storage unit 508 may still be included in router 202, or alternatively, may be external to router 202 but communicatively attached to line card 304 (e.g., as a network attached storage (NAS) device, storage area network (SAN) disks, disk array, etc.).

Processor 502 may include one or more processors, microprocessors, Application Specific Integrated Circuits (ASICs), and/or Field Programmable Gate Arrays (FPGAs), and/or other processing logic. In some implementations, processor 502 may include processors that are dedicated to more specific functions, such as packet processing, packet forwarding, memory management, etc.

Network interface 504 may include one or more physical or logical communication ports that enable line card 304 to communicate with other devices, line cards, and/or systems. Via the physical ports, network interface 504 may communicate via a network, such as the Internet, a terrestrial wireless network (e.g., a WLAN), a satellite-based network, etc.

Memory 506 may include a static memory, such as read only memory (ROM), and/or dynamic memory, such as random access memory (e.g., DRAM, SDRAM, SRAM, etc.) or onboard cache, content addressable memory (CAM), for storing data and machine-readable instructions. For example, a component of memory 506 may provide, for example, space for a replay buffer, queues for packet headers, packet buffer, etc., before the packets are sent toward one or more egress line cards 304 via switch fabric 306.

Storage unit 508 may include a floppy disk, CD ROM, CD read/write (R/W) disc, and/or flash memory, as well as other types of storage devices (e.g., hard disk drive) for storing data and/or machine-readable instructions (e.g., a program, script, etc.). Storage unit 508 may include captured images of a replay buffer.

Figure 5B:
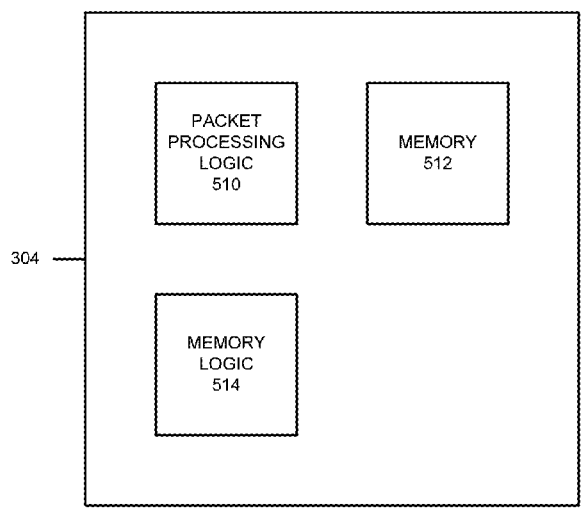
FIG. 5B is a block diagram illustrating exemplary functional components of the line card of FIG. 3.

FIG. 5B is a block diagram illustrating exemplary functional components of line card 304. As shown, line card 304 may include packet processing logic 510, memory 512, and memory logic 514. Depending on the implementation, line card 304 may include additional, fewer, or different components than those illustrated in FIG. 5B. For example, line card 304 may include a component for storing/measuring flow statistics. In addition, although not shown in FIG. 5B, line card 304 may include other components, such as a label information base (LIB), FIB, access control list, etc.

Packet processing logic 510 may place packets that are received at line card 304 in queues where they are temporarily held. If the packets are to receive cached routing service, packet processing logic 510 may encapsulate and place copies of packets in a replay buffer/storage unit 508 and forward the packets or the encapsulated packets to egress line cards 304 based on information in LIB/FIB. Conversely, if the received packets are already encapsulated, packet processing logic 510 may de-capsulate the received packets, send acknowledgments corresponding to the packets to a router from which the packets are received, and store the packets in a replay buffer/storage unit 508.

In some implementations, packet processing logic 510 may perform additional processing, such as flagging copies of the packets in replay buffer 604/storage unit 508, collecting flow statistics, classifying packets, queuing packets, writing packets in the replay buffer to storage unit 508, etc.

Figure 6A:
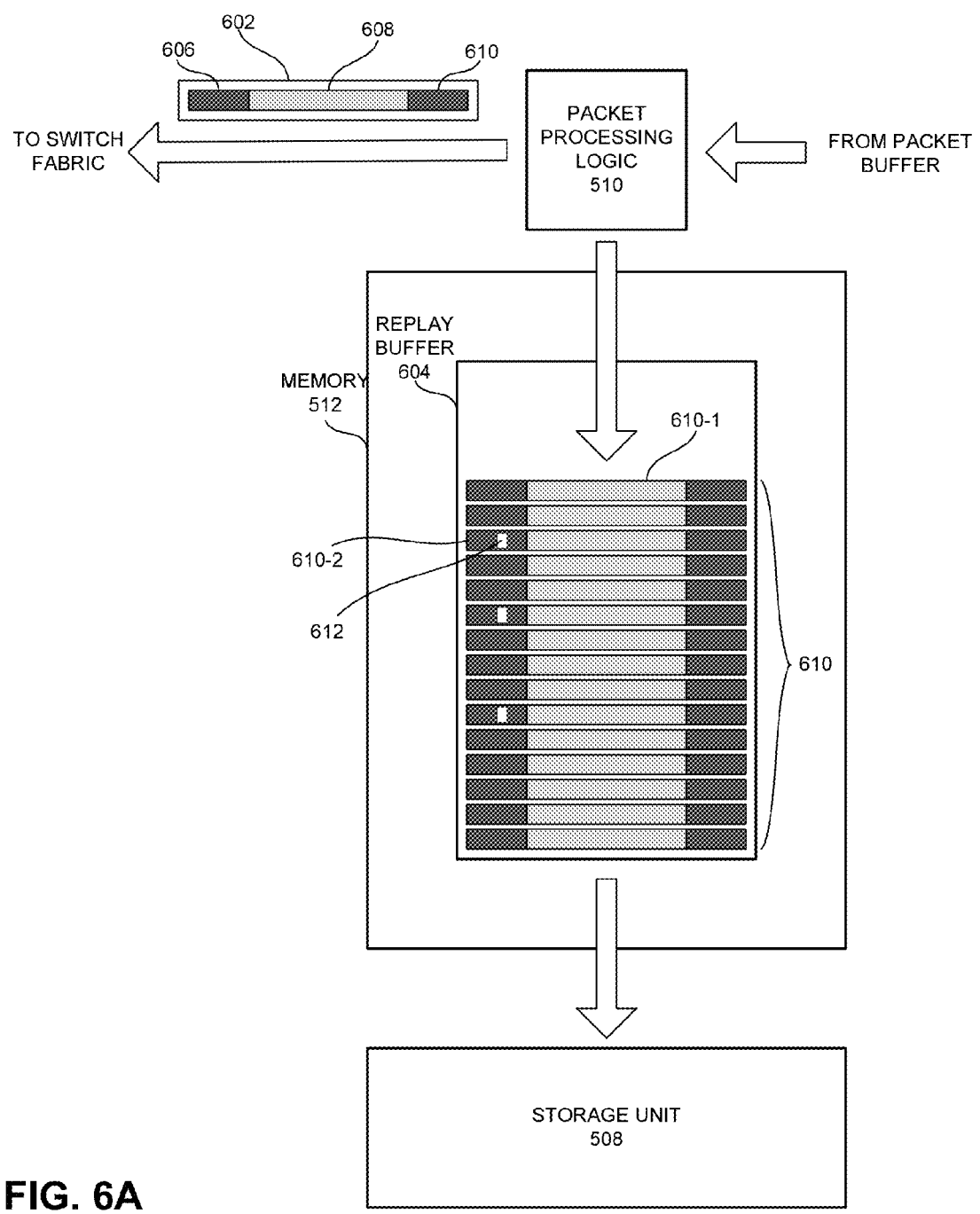
FIG. 6A illustrates exemplary packet processing that is associated with sending an encapsulated packet under cached routing service according to one implementation.

FIG. 6A illustrates exemplary packet processing that is associated with sending an encapsulated packet under cached routing service. In FIG. 6A, packet processing logic 510 encapsulates a packet in a packet buffer (not shown) and generates an encapsulated packet 602. As shown, encapsulated packet 602 may include a packet header 606, original packet 608, and packet tail 610. Depending on the implementation, encapsulated packet 602 may include additional, fewer, or different fields or portions than those illustrated in FIG. 6A.

As further shown in FIG. 6A, when packet processing logic 510 encapsulates original packet 608, packet processing logic 510 generates a copy of encapsulated packet 602, and places the copy in replay buffer 604 in memory 512. In FIG. 6A two of packets 610 are shown as packets 610-1 and 610-2. Furthermore, like packet 602, each of packets 610 includes an encapsulating header, tail, and a corresponding original packet.

In some implementations, the encapsulating header may include a time stamp for the transmission time of the encapsulated packet, an identifier, and/or one or more receipt bits. When packet processing logic 510 receives a notification or acknowledgment (from a remote router that is in the path to packet's destination, such as router 202-3), packet processing logic 510 may identify a copy 610, in replay buffer 604, that corresponds to the notification/acknowledgment, and set a flag in the copy 610. Setting the flag may entail, for example, setting one or more receipt bits in packet 610. For example, FIG. 6A shows packet 610-2 whose receipt bit(s) 612 is set (e.g., to a value of "0" or "1"). Subsequently, when packet processing logic 510 determines which of packets 610 to retransmit, packet processing logic 510 may examine the time stamp (not shown) and receipt bit(s) 612 in packet 610. Packet processing logic 510 may retransmit a packet 610 if receipt bit 612 in the packet 610 is not set and the time since the transmission is greater than a particular period. Alternatively, packet processing logic 510 may retransmit the packet 610 upon receipt of a request to transmit the packet.

In other implementations, the encapsulating header may not include receipt bits. In these implementations, when packet processing logic 510 receives a notification or acknowledgment, packet processing logic 510 may remove a copy that corresponds to the notification/acknowledgment from replay buffer 604. Furthermore, packet processing logic 510 may resend a packet 610 when the packet 610's time stamp is greater than a given threshold or when packet processing logic 510 receives a retransmission request.

About the time packet processing logic 510 retransmits packet 610, in some implementations, packet processing logic 510, may set a receipt bit 612 in another copy of packet 610 and place the other copy of the transmitted packet in replay buffer 604, with a new time stamp. In other implementations, packet processing logic 510 may simply update the time stamp, of the existing copy in replay buffer 508, to the time of the most recent transmission.

Periodically or when buffer 604 is filled above certain threshold (e.g., 80%), packet processing logic 510 may copy packets 610 (i.e., copies) in replay buffer 604 to storage unit 508. More specifically, in some implementations, packet processing logic 510 may copy packets 610 that have been transmitted before a particular time to storage unit 508. In other implementations, packet processing logic 510 may copy packets 610 whose receipt bits are set. In all of these implementations, subsequent to copying the packets to storage unit 508, packet processing logic 510 may remove the copied packets from replay buffer 604. This may free space in replay buffer 604 to receive new packets from packet processing logic 510.

Figure 6B:
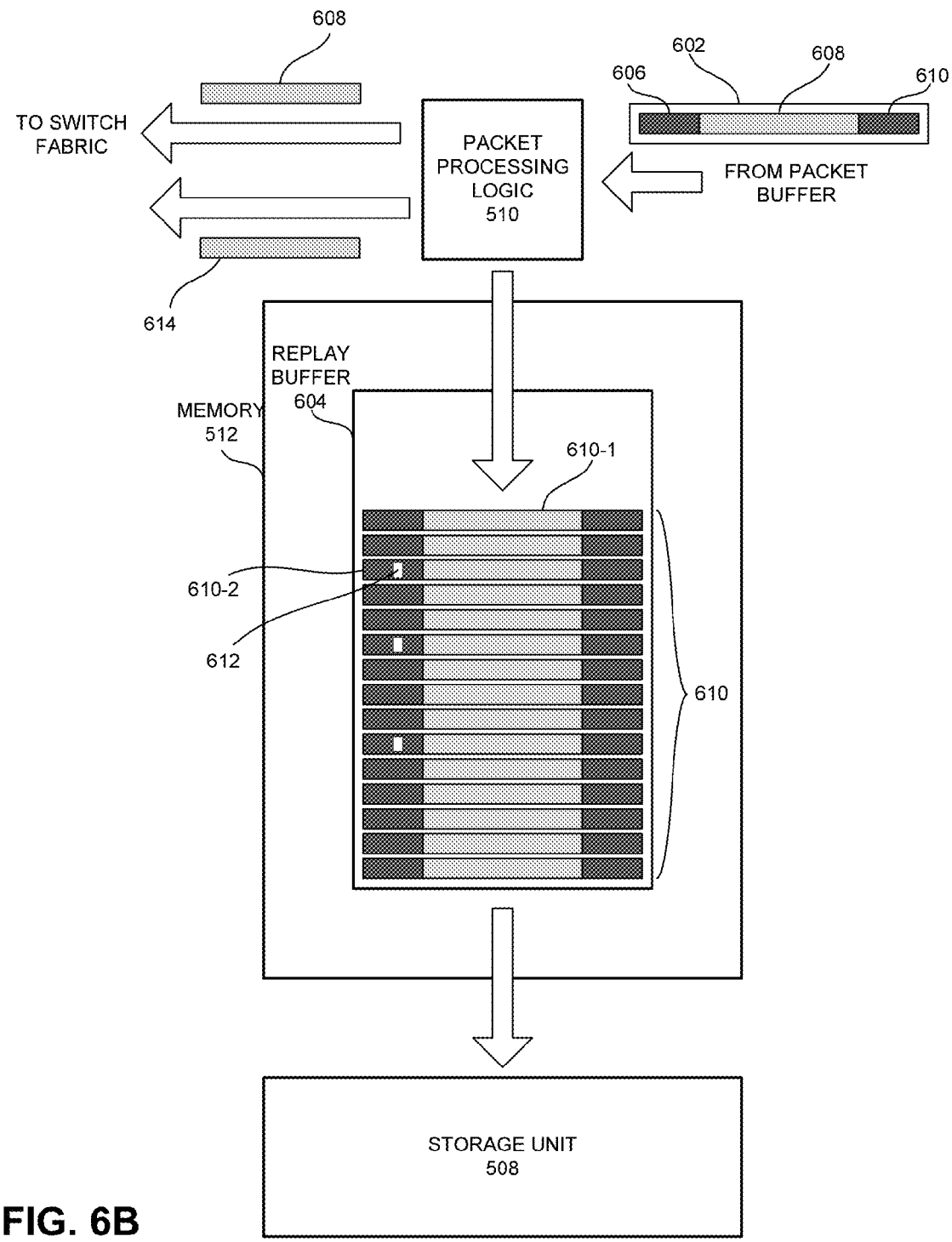
FIG. 6B illustrates exemplary packet processing that is associated receiving an encapsulated packet under cached routing service according to one implementation.

FIG. 6B illustrates exemplary packet processing that is associated with receiving an encapsulated packet under cached routing service. In FIG. 6B, assume that packet processing logic 510 has received an encapsulated packet 602. Thereafter, packet processing logic 510 may de-capsulate packet 602 to obtain original packet 608, forward packet 608 toward its original destination, produce an acknowledgment packet 614, and forward acknowledgment packet 614 toward the router from which encapsulated packet 602 was received. Furthermore, packet processing logic 510 may store a copy of packet 602 in replay buffer 604, with a new time stamp (e.g., a time stamp for the transmission of packet 608 to its destination), receipt bit, packet ID, etc.

In FIG. 6B, when packet processing logic 510 receives a replay request, router 202 may send one or more packets 610 in buffer 604 or storage unit 508. Furthermore, in FIG. 6B, packet processing logic 510 may handle copying packets 610 (i.e., copies) in replay buffer 604 to storage unit 508 in a manner similar to that described above for FIG. 6A.

Returning to FIG. 5B, memory 512 may include queues and buffers (e.g., replay buffer 604). If packets arrive in a burst, the packets may await in the queues/buffers in memory 512 until higher priority packets are processed and/or transmitted to egress line card 304 via switch fabric 306. In addition, copies of packets sent via cached routing service may be stored in replay buffer 604.

Memory logic 514 may change the size of memories and/or storage units that are allocated (e.g., replay buffer 604, storage unit 508). As described above, replay buffer 604 and/or storage unit 508 may become filled. Although packets in replay buffer 604 and/or storage unit 508 may be removed from their storage locations to free storage/buffer space, such removal may be unable to sufficiently accommodate accumulation of packets in replay buffer 604 and/or storage unit 508. To address such situations, memory logic 514 may resize buffer 604 and/or storage unit 508, based on changing network conditions and operator specifications.

In some implementations, the size of replay buffer 604 and/or storage unit 508 may depend on expected bandwidth and the duration (e.g., milliseconds, seconds, minutes, etc.) for which replay buffer 604/storage unit 508 is expected to store packets. For example, assume that an average duration in which an acknowledgment receipt or notification arrives is X milliseconds at Y bandwidth. In such an instance, replay buffer 604 may need to be capable of buffering a sufficient number of packets for at least X milliseconds at Y bandwidth. As the average time to receive an acknowledgment increases/decreases, memory logic 514 may increase/decrease the size of replay buffer 604 and/or storage unit 508. In some configurations, router 202 may determine the initial size of buffers or storage units based on messages that router 202 exchange with other routers. In other configurations, an operator may set the initial sizes in router 202 via a user interface (e.g., a graphical user interface (GUI)).

Figure 7:
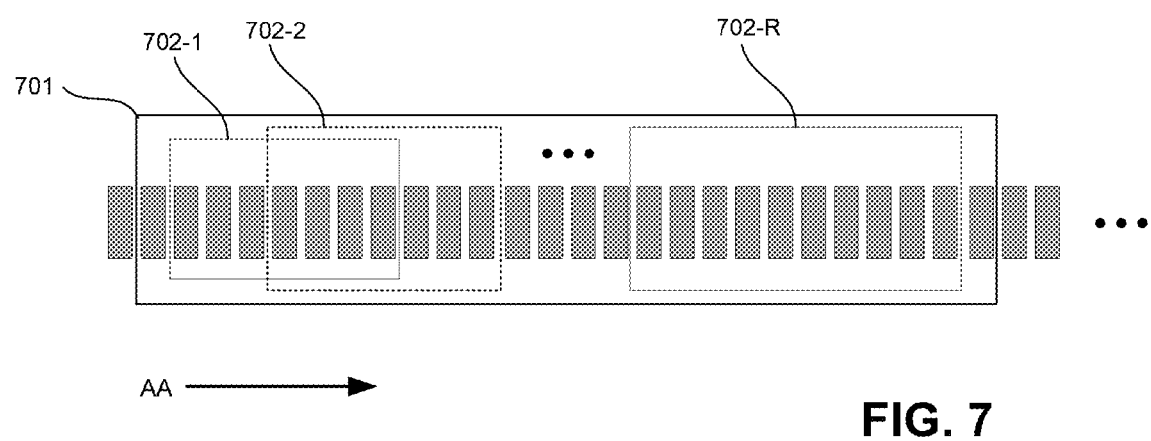
FIG. 7 illustrates an exemplary time window at different instances.

In one implementation, memory logic 514 may obtain, for buffer 604 and/or storage unit 508, packet statistics over a sliding time window. FIG. 7 illustrates an exemplary sliding time window 702, over a memory block 701, from time instance 1 to time instance R. Sliding time window 702 may correspond to a time interval of particular duration (e.g., 3 minutes). As shown, the number of packets in sliding time windows 702 may vary. Memory block 701 may correspond to replay buffer 604 or storage unit 508 or a portion of buffer 604 or storage unit 508.

As shown in FIG. 7, as packets or packet headers arrive in memory block 701 and enter sliding time window 702, oldest packets may leave sliding time window 702 in the direction indicated by arrow AA. For a given instance of time, line card 304 may obtain packet statistics/data, such as the average time that a packet subscribed to cached routing service takes to receive a notification (after the transmission), average packet size, QoS of each packet, etc. for the duration of sliding time window 702.

FIG. 7 shows packets (or packet headers) that are in sliding time window 702 at times $t_1, t_2, \ldots$, and $t_R$. Accordingly, line card 304 may obtain statistics pertaining to memory block 701 (as distinguished from packet statistics) over sliding time window 702 by averaging memory block 701 attributes/parameters at $t_1$ through $t_R$. For example, line card 304 may determine an average number of packets in replay buffer 604 over the duration of sliding time window 702 and over many instances.

In FIG. 7, because obtaining a queue/packet statistics involves computing a moving average over the time spanned by sliding time window 702, large variations in measurements that are short-lived may not result in changes in measured/computed attributes for memory block 701. For example, memory logic 514 may not change the size of replay buffer 604 upon observing minor fluctuations in the average number of packets in replay buffer 604 (e.g., a measured percentage of total packets serviced at buffer 604). In contrast, when memory logic 514 observes a sudden burst in a particular type of traffic and an increase in the number of small packets, memory logic 514 may also observe an increased average number of packets in replay buffer 604. Accordingly, memory logic 514 may increase the size of replay buffer 604.

Figure 8A:
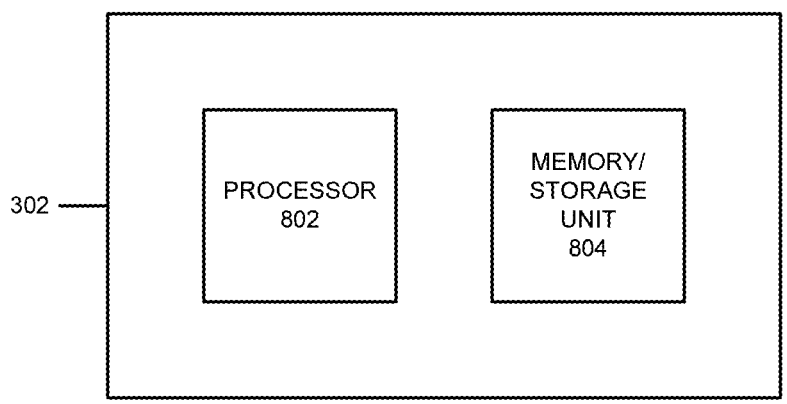
FIG. 8A is a block diagram illustrating exemplary components of the control module of FIG. 3.

FIG. 8A is a block diagram illustrating exemplary components of control module 302. As shown, control module 302 may include a processor 802 and a memory/storage unit 804. Depending on the implementation, control module 302 may include additional, fewer, and/or different components than those illustrated in FIG. 8A.

Processor 802 may include one or more processors, microprocessors, ASICs, and/or FPGAs, and/or other processing logic. In some implementations, processor 802 may include processors dedicated to more specific functions, such as memory management, packet inspection, etc. Memory/storage unit 804 may include CAM, static memory, such as read only memory (ROM), and/or dynamic memory, such as random access memory (e.g., dynamic RAM (DRAM), synchronous DRAM, static RAM (SRAM), etc.), or onboard cache, for storing data and machine-readable instructions. In addition, memory/storage unit 804 may include storage media, such as a magnetic and/or optical storage/recording medium. In some implementations, a portion of memory/storage unit 804 may be mounted under a directory or mapped to a drive.

Figure 8B:
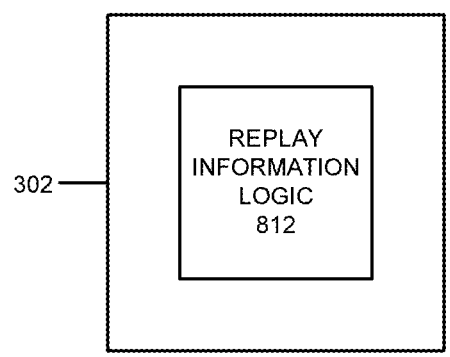
FIG. 8B is a block diagram illustrating exemplary functional components of the control module of FIG. 3.

FIG. 8B is a block diagram illustrating exemplary functional components of control module 302. As shown, control module 302 may include replay information logic 812.

Depending on the implementation, control module 302 may include additional or different functional components. For example, in one implementation, control module 302 may include a firewall application, packet inspection application, a copy of forwarding information base (FIB), label information base (LIB), etc. Furthermore, although not shown in FIG. 8B, control module 302 may include additional components, such as routing logic for exchanging routing information with other routers, routing information base (RIB), etc.

Replay information logic 812 may communicate with other replay information logic 812 in routers 202 to exchange or obtain information that is associated with replay buffer 604 and/or storage unit 508 (e.g., sizes). In addition, replay information logic 812 in router 202 may provide a central or coordinated basis for providing uniform, network-wide (global) buffer/queue adjustments.

In some implementations, replay information logic 812 may negotiate, with other routers, what bandwidth properties and/or buffer/queue attributes/properties to support (e.g., parameters associated with bandwidth bursting, limits on replay buffer size, replay information logic 812 version, the size of storage unit 508, etc.). Thereafter, replay information logic 812 may pass the negotiated attributes/properties to line cards 304, where memory logic 514 may set parameters for replay buffer 604 and/or storage device 508, etc.

In some implementations, replay information logic 812 may also exchange, with other routers 202, statistical information collected in sliding time windows 702. Line card 304 may use the statistical information received from other routers 202 in adjusting the size of replay buffer 604 and/or the size of storage unit 508.

In some implementations, router 202 may change its buffer 604 and/or storage unit 508 when more than a threshold number of routers 202 indicate, via replay information logic 812, changes in network traffic pattern. By setting such a threshold, routers 202 may prevent an isolated incident at a particular router 202 from having global effect.

Figure 9:
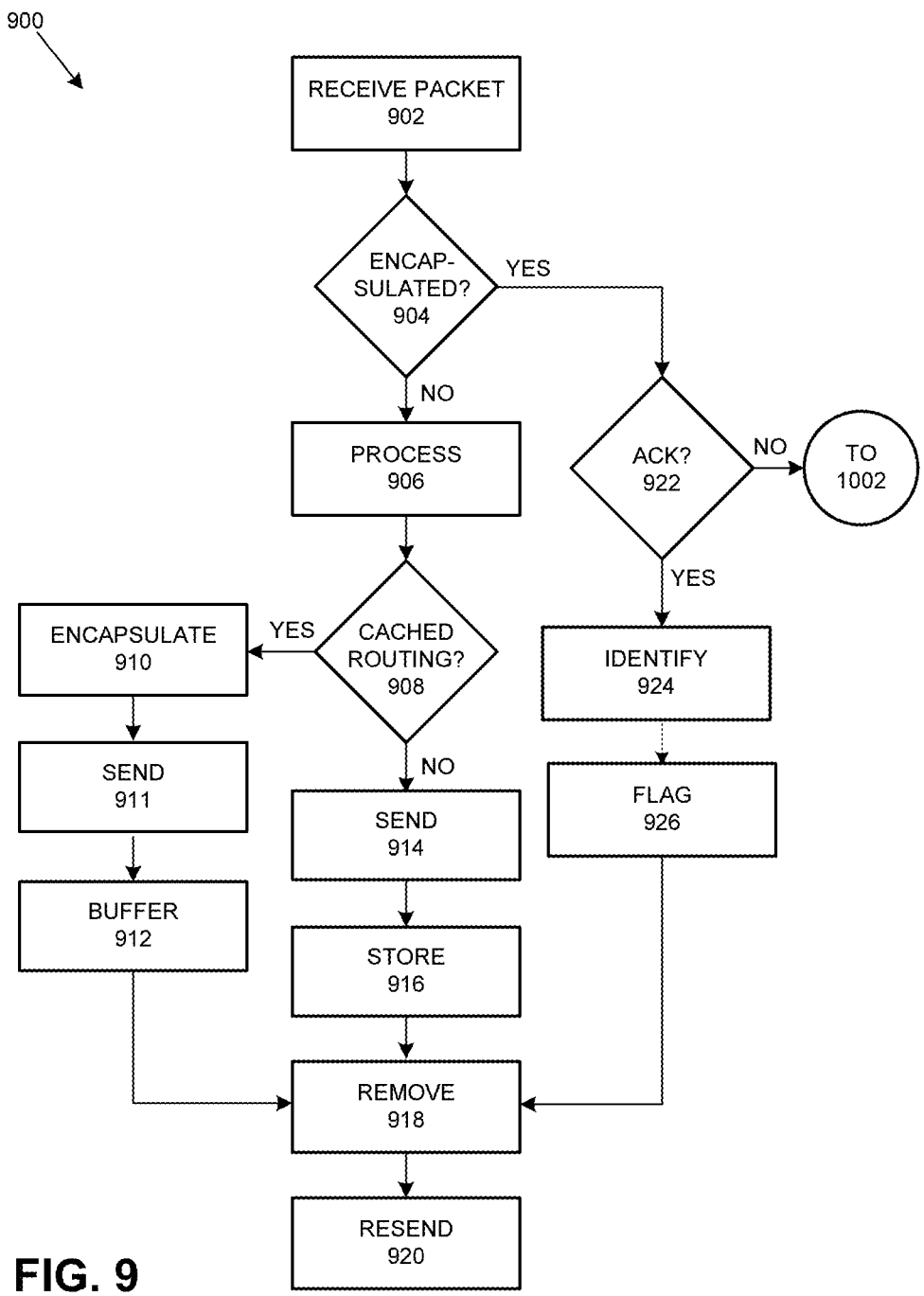
FIG. 9 is a flow diagram of an exemplary process associated with cached routing service.

FIG. 9 is a flow diagram of an exemplary process associated with cached routing service. Process 900 may begin after a boot up of router 202. During the boot up, router 202 may perform bookkeeping tasks, such as mounting a disk, allocating memory, spinning off different processes, etc.

Router 202 may receive a packet (block 902). Upon receipt of the packet, line card 304 may determine whether the packet is encapsulated packet (e.g., packet that has been sent via the cached routing service protocol) (block 904). If the packet is not an encapsulated packet (block 904: no), process 900 may proceed to block 906.

Line card 304 may process the packet for forwarding (block 906). The type of processing may depend on the implementation. For example, in one implementation, line card 304 may split the packet into cells and place the "cellified" packet into a packet buffer. In another example, line card 304 may augment a packet header with information obtained from an access control list.

Line card 304 may determine whether the packet is to receive cached routing service (block 908). Line card 304 may make such a determination based on, for example, header information (e.g., IP address and looking up the IP address in a table or an access control list). If the packet is to be sent under the cached routing protocol (block 908: yes), line card 304 may encapsulate the packet (block 910). The encapsulating header may include, for example, information that identifies the specific protocol (e.g., an extension of IP/MPLS, a cached routing service protocol, etc.) via which the encapsulated packet is to be forwarded, time stamp of the transmission time, receipt bits, ID of the packet, IP address/label of the router that is to send the acknowledgment, etc. In some implementations, the encapsulating header may also include a checksum.

Line card 304 may send the encapsulated packet to an egress line card 304 from which the packet is to be transmitted toward its destination (block 911). Line card 304 may buffer a copy of the encapsulated packet (block 912). In one implementation, the buffering may include placing the encapsulated packet in replay buffer 604. In a different implementation, the buffering may include storing the packet in storage unit 508.

Returning to block 908, if the packet is not to receive cached routing service (block 908: no), process 900 may proceed to block 914. At block 914, line card may send the packet to an egress line card 304 from which the packet is to be transmitted toward its destination (block 914). Process 900 may proceed to block 916.

At block 916, line card 304 may store the buffered copy, in replay buffer 604, of the packet in storage unit 508 (block 918). In some implementations, storing the copy in storage unit 508 may be part of the process in which groups packets of replay buffer 604 are streamed into storage unit 508. In other implementations, storing the copy may entail individually copying a transmitted packet to storage unit 508. In some implementations, only flagged packets (e.g., receipt bit is set) may be committed to storage unit 508.

Line card 304 may remove the stored packets from replay buffer 604 and/or storage unit 508 (block 918). In some implementations, line card 304 may remove, from replay buffer 604 or storage unit 508, only the packets that received acknowledgments. In other implementations, line card 304 may remove all stored packets whose time stamps (in encapsulating headers) are older than a given time. In the latter case, if a packet whose time stamp is older than the given time has not yet received an acknowledgment, line card 304 may generate and send an alert or warning to an appropriate network entity (e.g., device, network administrator, etc.) at the time of its removal.

Line card 304 may resend the packet if the packet has not yet received an acknowledgment and is still in either replay buffer 604 or storage unit 508 (block 920). In some implementations, when line card 304 resends the packet, line card 304 may flag the encapsulating header to indicate that a new transmission is to be performed. This may result in a new entry of the copy in replay buffer 604 or storage unit 508.

Returning to block 904, if the packet is an encapsulated packet (block 904: yes), line card 304 may determine if the packet is an acknowledgment packet (block 922). If the packet is not an acknowledgment packet (block 922: no), process 900 may proceed to block 1002 of process 1000 (see FIG. 10). Otherwise (block 922: yes), line card 304 may identify, in buffer 604 or storage unit 508, a packet corresponding to the acknowledgment packet (block 924). Once the corresponding packet is identified, line card 304 may flag the encapsulating header (e.g., set the receipt bit) (block 926). In a different implementation, upon identification of the packet, line card 304 may remove the packet from replay buffer 504/storage unit 510.

Figure 10:
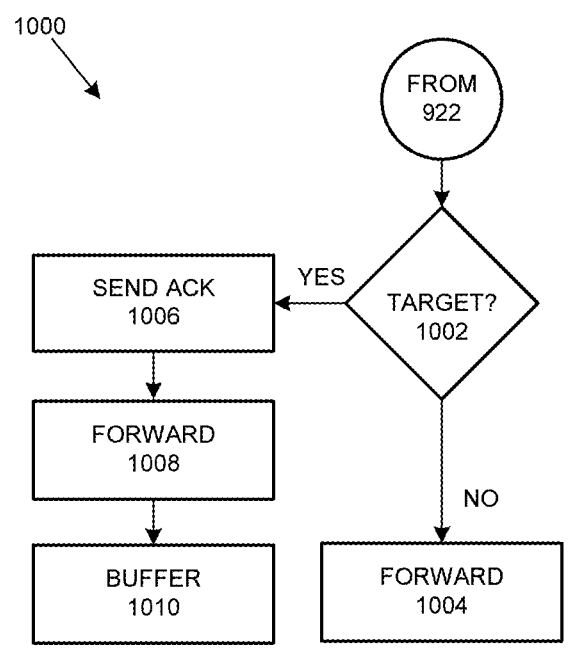
FIG. 10 is a flow diagram of another exemplary process associated with cached routing service.

FIG. 10 is a flow diagram of another exemplary process 1000 associated with cached routing service. Process 1000 may begin after line card 304 determines that the packet received at block 902 is an encapsulated packet (block 904: yes) but not an acknowledgment packet (block 922: no).

Line card 304 may determine whether router 202 that includes line card 304 is the target router for the encapsulated packet (block 1002). A target router is a device that is on packet's path to its destination. When the target router receives the packet from an originating router, the target router sends an acknowledgment packet to the originating router.

If router 202 that includes line card 304 is not the target router (block 1002: no), line card 304 may forward the packet toward its destination (block 1004). Otherwise (block 1002: yes), line card 304 may send an acknowledgment packet (or simply "acknowledgment") to a router from which the encapsulated packet originated (block 1006) and proceed to block 1008.

At block 1008, line card 304 may de-capsulate the encapsulated packet to obtain an original packet inside the encapsulated packet, and forward the original packet toward its destination (block 1008). Concurrently with the transmission or after the transmission, line card 304 may place the original packet in a buffer (e.g., replay buffer 604) and/or storage unit 508 (block 1010). The buffer 604 or storage unit 508 may include information pertaining to the packet, such as a receipt bit, time stamp, packet identifier, etc. Should the destination device of the packet fail to receive the packet, router 202 may retrieve the copy from the buffer 604 or storage unit 508 and retransmit the packet to the destination device.

In the above description, a router may provide for cached routing service. In cached routing service, packets are guaranteed to be successfully routed to their destinations. Guaranteed routing of the packets may be valuable for many types of applications (e.g., brokerage transactions, transmission of syslog messages, bandwidth bursting, elimination of retry attempts for failed packet delivery, etc.).

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In another example, while a series of blocks have been described with regard to the processes illustrated in FIGS. 9 and 10, the order of the blocks may be modified in other implementations. In addition, non-dependent blocks may represent blocks that can be performed in parallel. Furthermore, some of the blocks may be omitted in different implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a," "an," and "the" is intended to include one or more items. Further, the phrase "based on" is intended to mean "based, at least in part, on" unless explicitly stated otherwise.

What is claimed is:

1. A device comprising:
 a line card including:
  a dynamic memory that includes a buffer; and
  a processor configured to:
   receive a packet via a network, wherein the packet is an Internet Protocol (IP) packet;
   determine whether the received packet is encapsulated with a header associated with a cached routing service;
   in response to determining that the received packet is not encapsulated with a header associated with the cached routing service, determine whether the packet is to receive the cached routing service;
   in response to determining that the packet is to receive the cached routing service:
    add a first header to the packet to encapsulate the packet, the first header specifying a protocol for the cached routing service;
    send the encapsulated packet on a path from the device to a first destination of the packet;
    store a copy of the encapsulated packet in the buffer; and
    flag or remove the copy of the encapsulated packet in the buffer in response to the device receiving an acknowledgement from a remote device that is on the path, wherein the acknowledgement indicates that the remote device has received the encapsulated packet from the device,
 wherein the first destination is different from the remote device, and
 wherein the remote device is not a destination of the packet.

2. The device of claim 1, wherein when the processor flags the copy of the encapsulated packet, the processor indicates, in the buffer, that the acknowledgment from the remote device has been received.

3. The device of claim 1, further comprising a storage device to receive contents of the buffer, wherein the storage device includes:
 one or more storage devices external to the device;
 a network attached storage (NAS) device;
 a storage area network (SAN) device; or
 a storage device included in the device.

4. The device of claim 1, wherein the copy of the encapsulated packet includes:
 a time stamp indicating a time of sending the encapsulated packet from the device.

5. The device of claim 1, wherein the processor is further configured to:
 resend the encapsulated packet toward the first destination when the device does not receive an acknowledgment corresponding to the encapsulated packet within a prescribed time.

6. The device of claim 1, wherein the device includes:
 an Internet Protocol (IP) or Multiprotocol Label Switching (MPLS) router.

7. The device of claim 1, wherein the processor is further configured to:
 send packets in the buffer in a bandwidth burst.

8. The device of claim 1, wherein the processor is further configured to:
 flush copies of encapsulated packets from the buffer to a storage device when a period of time greater than a threshold elapses.

9. The device of claim 1, wherein the processor is further configured to:
 move copies of encapsulated packets from the buffer to a storage device when acknowledgment packets corresponding to the copies are received.

10. The device of claim 1, wherein when the device receives, from a network device, a second encapsulated packet with a second header specifying the protocol for the cached routing service, the processor is further configured to:
- de-capsulate the second encapsulated packet;
- store the de-capsulated packet in the buffer;
- send an acknowledgement packet corresponding to the de-capsulated packet to the network device; and
- forward the de-capsulated packet to a destination of the de-capsulated packet.

11. The device of claim 1, wherein when the device receives, from a network device, a second encapsulated packet with a second header specifying the protocol for the cached routing service, the processor is further configured to:
- forward the second encapsulated packet to a router or a switch on a path toward a destination of the second encapsulated packet without storing the second encapsulated packet in the buffer.

12. The device of claim 1, wherein the device is further configured to:
- receive a request to replay or resend specified, encapsulated packets in the buffer; and
- send the specified, encapsulated packets in the buffer in response to the request to replay or resend the specified, encapsulated packets in the buffer.

13. A method comprising:
- receiving a packet at a first device, wherein the packet is an Internet Protocol (IP) packet, wherein the first device includes a dynamic memory that includes a buffer;
- determining, by the first device, whether the received packet is encapsulated with a first header associated with a cached routing service;
- determining, by the first device, whether the received packet is to be sent via the cached routing service in response to determining that the received packet is not encapsulated with the first header associated with the cached routing service; and
- in response to determining that the received packet is to be sent via the cached routing service,
  - encapsulating, by the first device, the received packet with a second header associated with the cached routing service,
  - sending the encapsulated packet from the first device toward a destination of the packet over a path between the first device and the destination, and
  - storing the encapsulated packet in the buffer in the dynamic memory.

14. The method of claim 13, wherein the second header includes one or more of:
- a time stamp;
- an identifier for the packet; or
- a receipt bit.

15. The method of claim 14, further comprising:
- flagging the encapsulated packet in the buffer by setting the receipt bit of the encapsulated packet in the buffer when an acknowledgment corresponding to the encapsulated packet is received from a router on the path.

16. The method of claim 13, further comprising:
- forwarding the packet toward the destination of the packet without encapsulating the packet with a header associated with the cached routing service in response to determining that the received packet is not to be provided with the cached routing service.

17. The method of claim 13, further comprising:
- determining average numbers of packets in the buffer over a duration, and
- increasing a size of the buffer when the average numbers of packets in the buffer increase over time.

18. The method of claim 13, further comprising:
- in response to determining that the received packet is encapsulated with the first header associated with the cached routing service, determining, by the first device, whether the received packet is an acknowledgment packet; and
- when the received packet is an acknowledgment packet, flagging a packet, in the buffer, corresponding to the acknowledgment packet.

19. The method of claim 18, further comprising:
- in response to determining that the received packet is not an acknowledgment packet, determining whether the first device is a target router that is to send an acknowledgment for the received packet; and
- forwarding, by the first device, the acknowledgment for the received packet when the first device is the target router.

20. A non-transitory computer-readable medium, comprising computer-executable instructions, for causing one or more processors executing the computer-executable instructions to:
- receive a packet at a device that includes a dynamic memory that includes a buffer, wherein the packet is an Internet Protocol (IP) packet, wherein the device includes the one or more processors;
- determine whether the received packet is encapsulated with a header associated with a cached routing service;
- in response to determining that the received packet is not encapsulated with a header associated with the cached routing service, determine whether the packet is to receive the cached routing service;
- in response to determining that the packet is to receive the cached routing service:
  - add a first header to the packet to encapsulate the packet when the packet is to receive cached routing service, the first header specifying a protocol for the cached routing service;
  - send the encapsulated packet on a path from the device to a first destination of the packet, wherein the path includes a first remote device and a second remote device, and wherein the first remote device is different from the second remote device;
  - store a copy of the encapsulated packet on the buffer; and
  - flag or remove the copy of the encapsulated packet in the buffer in response to the device receiving an acknowledgement from the first remote device that is on the path from the device to the first destination, wherein the acknowledgement indicates that the first remote device received the encapsulated packet from the device,
- wherein the first remote device is different from the first destination,
- wherein the first remote device comprises another dynamic memory including another buffer, and
- wherein, when the first remote device receives the encapsulated packet from the device via the network, the first remote device is configured to:
  - determine whether the received encapsulated packet is encapsulated with a header associated with the cached routing service; and
  - in response to determining that the received encapsulated packet is encapsulated with a header associated with the cached routing service:
    - send the acknowledgment packet to the device;
    - send the received encapsulated packet on the path from the remote device to the first destination of the packet;

store a copy of the received encapsulated packet in the other buffer; and flag or remove the copy of the received encapsulated packet in the other buffer in response to the remote device receiving a second acknowledgement from the second remote device that is on the path from the remote device to the first destination, wherein the second acknowledgement indicates that the second remote device has received the encapsulated packet from the remote device, wherein the first destination is different from the second remote device.

* * * * *